US011451678B2

(12) United States Patent
Tasaka

(10) Patent No.: US 11,451,678 B2
(45) Date of Patent: Sep. 20, 2022

(54) IMAGE FORMING APPARATUS, IMAGE FORMING METHOD, AND RECORDING MEDIUM DEFINE A FOLDING LINES TO PROCESS USER INFORMATION IN ACCORDANCE WITH A POSITION AND A SIZE OF AREA IN A TEMPLATE

(71) Applicant: Masaki Tasaka, Kanagawa (JP)

(72) Inventor: Masaki Tasaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/443,552

(22) Filed: Jul. 27, 2021

(65) Prior Publication Data

US 2022/0094800 A1   Mar. 24, 2022

(30) Foreign Application Priority Data

Sep. 18, 2020 (JP) .............................. JP2020-156889

(51) Int. Cl.

| | |
|---|---|
| *G06F 3/12* | (2006.01) |
| *H04N 1/00* | (2006.01) |
| *H04N 1/32* | (2006.01) |
| *G09F 7/00* | (2006.01) |
| *B41M 1/10* | (2006.01) |
| *G06F 40/174* | (2020.01) |
| *H04N 1/405* | (2006.01) |
| *G06F 40/106* | (2020.01) |

(52) U.S. Cl.
CPC ....... *H04N 1/00466* (2013.01); *G06F 3/1204* (2013.01); *G06F 3/1238* (2013.01); *G06F 3/1256* (2013.01); *G06F 3/1257* (2013.01); *H04N 1/32144* (2013.01); *B41M 1/10* (2013.01); *G06F 3/1243* (2013.01); *G06F 40/106* (2020.01); *G06F 40/174* (2020.01); *G09F 7/00* (2013.01); *H04N 1/4056* (2013.01); *H04N 1/4057* (2013.01)

(58) Field of Classification Search
None
See application file for complete search history.

(56) References Cited

U.S. PATENT DOCUMENTS

| | | | | |
|---|---|---|---|---|
| 9,493,195 | B1 * | 11/2016 | Willis | .................. B62D 53/067 |
| 2004/0148573 | A1 * | 7/2004 | Buice | .................... G06F 40/174 |
| | | | | 715/205 |
| 2009/0237696 | A1 * | 9/2009 | Hinaga | .............. H04N 1/32112 |
| | | | | 358/448 |

(Continued)

FOREIGN PATENT DOCUMENTS

| | | |
|---|---|---|
| JP | 2015-103131 | 6/2015 |
| JP | 2019-220989 | 12/2019 |

*Primary Examiner* — Haris Sabah
(74) *Attorney, Agent, or Firm* — IPUSA, PLLC

(57) ABSTRACT

An image forming apparatus includes an image forming device to perform image formation and circuitry. The circuitry acquires, from a memory, a template image defining a user information area in which user information is input, acquires the user information based on a user input operation, processes the user information in accordance with a position and a size of the user information area, generates a combined image in which the user information is combined with the template image acquired from the memory, and instructs the image forming device to form the combined image on a sheet.

7 Claims, 13 Drawing Sheets

(56) References Cited

U.S. PATENT DOCUMENTS

| | | | |
|---|---|---|---|
| 2015/0128461 A1* | 5/2015 | Simon | G09F 1/06 |
| | | | 493/405 |
| 2016/0253143 A1 | 9/2016 | Koike | |
| 2016/0381250 A1* | 12/2016 | Hirai | H04N 1/00411 |
| | | | 358/1.14 |
| 2019/0299656 A1* | 10/2019 | Kako | G06F 3/1284 |

* cited by examiner

FIG. 8

| PREFERENCE SETTING | SHEET SIZE | IMAGE PATH | NAME INPUT AREA START POSITION | NAME INPUT AREA SIZE | TEMPLATE |
|---|---|---|---|---|---|
| ON | A4 | hdd/nameplate/template/A4.jpg | LENGTH: 50 mm WIDTH: 60 mm | LENGTH: 55 mm WIDTH: 177 mm | |
| OFF | B5 | hdd/nameplate/template/B5.jpg | LENGTH: 42 mm WIDTH: 50 mm | LENGTH: 49 mm WIDTH: 157 mm | |

IMAGE FORMING APPARATUS, IMAGE FORMING METHOD, AND RECORDING MEDIUM DEFINE A FOLDING LINES TO PROCESS USER INFORMATION IN ACCORDANCE WITH A POSITION AND A SIZE OF AREA IN A TEMPLATE

CROSS-REFERENCE TO RELATED APPLICATION

This patent application is based on and claims priority pursuant to 35 U.S.C. § 119(a) to Japanese Patent Application No. 2020-156889, filed on Sep. 18, 2020, in the Japan Patent Office, the entire disclosure of which is hereby incorporated by reference herein.

BACKGROUND

Technical Field

Embodiments of the present disclosure relate to an apparatus and method for forming an image including user information, and a non-transitory recording medium storing program codes for causing a computer to execute processing for forming the image.

Related Art

In meeting assist systems, an organizer or a presenter of a meeting registers in advance electronic data of a material to be referred to in the meeting, and a participant of the meeting acquires the registered electronic data and displays the acquired electronic data on a screen. Thus, the material can be shared and distributed without printing.

Depending on the situation of the user, the user may want to print the material. A related art provides a meeting assist system that includes an image forming apparatus to enable registration of electronic data of a document and printing of the document.

SUMMARY

An embodiment of the present disclosure provides an image forming apparatus to form an image including user information. The image forming apparatus includes an image forming device to perform image formation and circuitry. The circuitry acquires, from a memory, a template image defining a user information area in which user information is input, acquires the user information based on a user input operation, processes the user information in accordance with a position and a size of the user information area, generates a combined image in which the user information is combined with the template image acquired from the memory, and instructs the image forming device to form the combined image on a sheet.

Another embodiment of the present disclosure provides a method for forming an image including user information. The method includes acquiring, from a memory, a template image defining a user information area in which the user information is input; acquiring the user information based on a user input operation; processing the user information in accordance with a position and a size of the user information area; generating a combined image in which the user information is combined with the template image; and forming the combined image on a sheet.

Yet another embodiment of the present disclosure provides a non-transitory recording medium storing a plurality of program codes which, when executed by one or more processors, causes the processors to perform the above-described method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 8 is a diagram illustrating an example of template data stored in a memory illustrated in FIG. 4;

Figure 1:
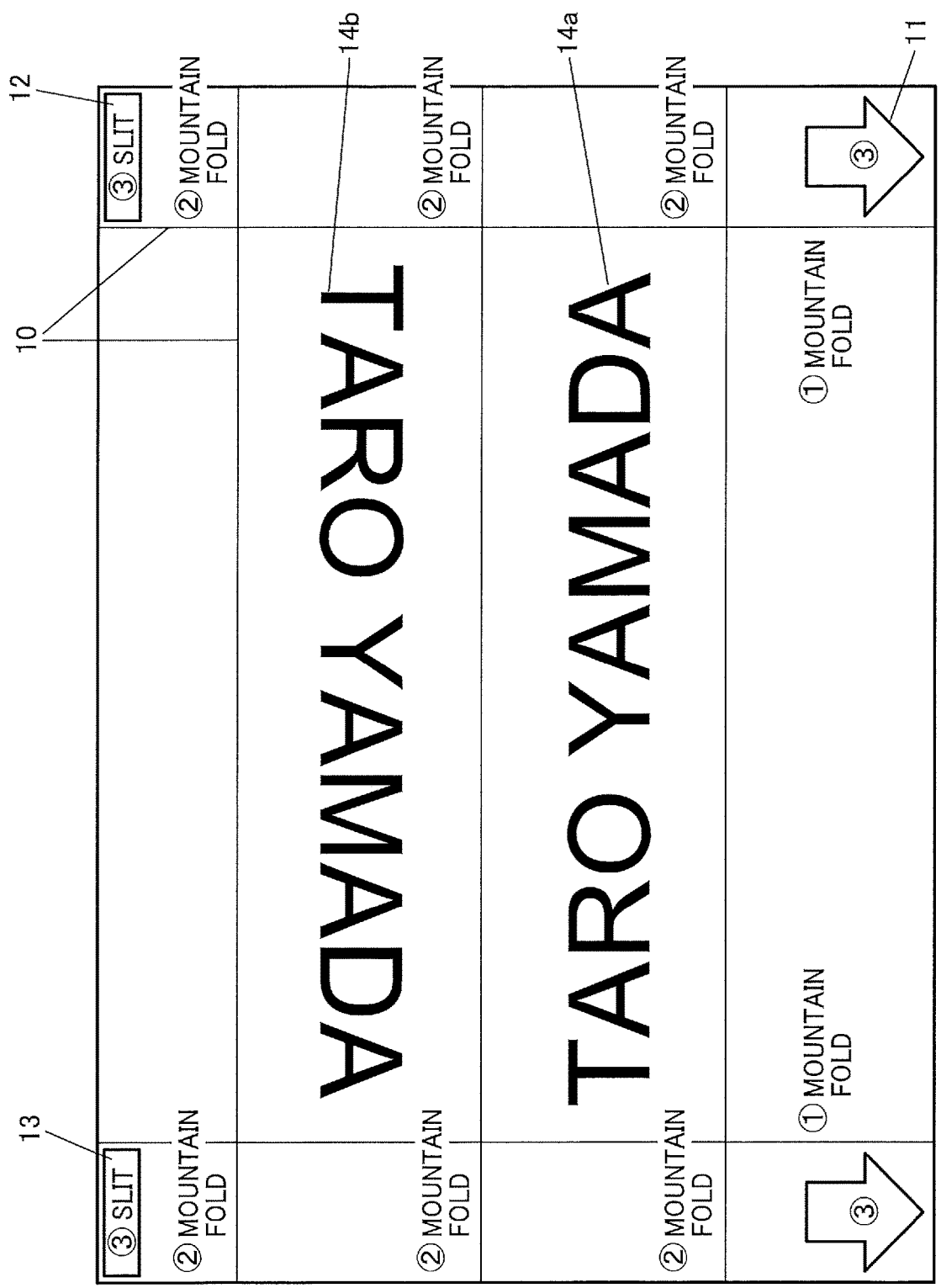
FIG. 1 is a diagram illustrating an example of printed matter necessary for a meeting.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments according to the present disclosure are described below. However, the present disclosure is not intended to be limited to the embodiments described herein. A meeting requires printed matters such as desktop nameplates that are not registered as meeting materials but are printed using a template.

FIG. 1 is a diagram illustrating an example of printed matter necessary for a meeting. The printed matter in this example is a desktop nameplate template combined with a username and printed on paper. However, the printed matter necessary for a meeting is not limited to a printed desktop nameplate, and is not limited to a printed matter printed on paper.

The desktop nameplate is placed on a meeting table installed in a meeting room in which a meeting is held, in order to display the name of a meeting organizer and the names of participants of the meeting. The template is an image in which characters, sentences, figures, and the like are arranged.

The desktop nameplate is three-dimensionally assembled so that, when placed on the meeting table, the name can be seen by other participants and the desktop nameplate does not fall down. Therefore, the template includes fold lines 10 (e.g., for mountain fold) for three-dimensional assembling, arrows 11 indicating an insertion direction, character strings 12 indicating an insertion slit, and numbers 13 indicating a folding order.

The template includes two name input areas 14a and 14b (examples of a user information area) in which a name is input. A user enters his or her name using a keyboard or the like. The input name is automatically enlarged or reduced, a copy thereof is generated, and the generated copy is rotated by 180°.

In the template, the enlarged or reduced name is put in the name input area 14a, and the copy of the name rotated by 180° is put in the name input area 14b.

Figure 2:
FIG. 2 is a diagram illustrating an example of a desktop nameplate that can be assembled from the printed matter illustrated in FIG. 1.

FIG. 2 is a view illustrating an example of a desktop nameplate assembled from the printed matter illustrated in FIG. 1. The printed matter illustrated in FIG. 1 is folded along the fold lines 10, and the portion printed with the arrows 11 is inserted into a double-folded portion printed with the character strings 12 indicating the insertion slit. Then, the desktop nameplate shaped like a triangular prism having a hollow is assembled as illustrated in FIG. 2.

The desktop nameplate is arranged on the meeting table in front of a seated user so that two faces (first and second faces) having the printed username face the user and other participants facing the user. Thus, another participant sitting on the same side as the user can see the name printed on the first face facing the user, and another participant sitting on the opposite side to the user can see the name printed on the second face facing the opposite side, to ascertain the name of the user.

Figure 3:
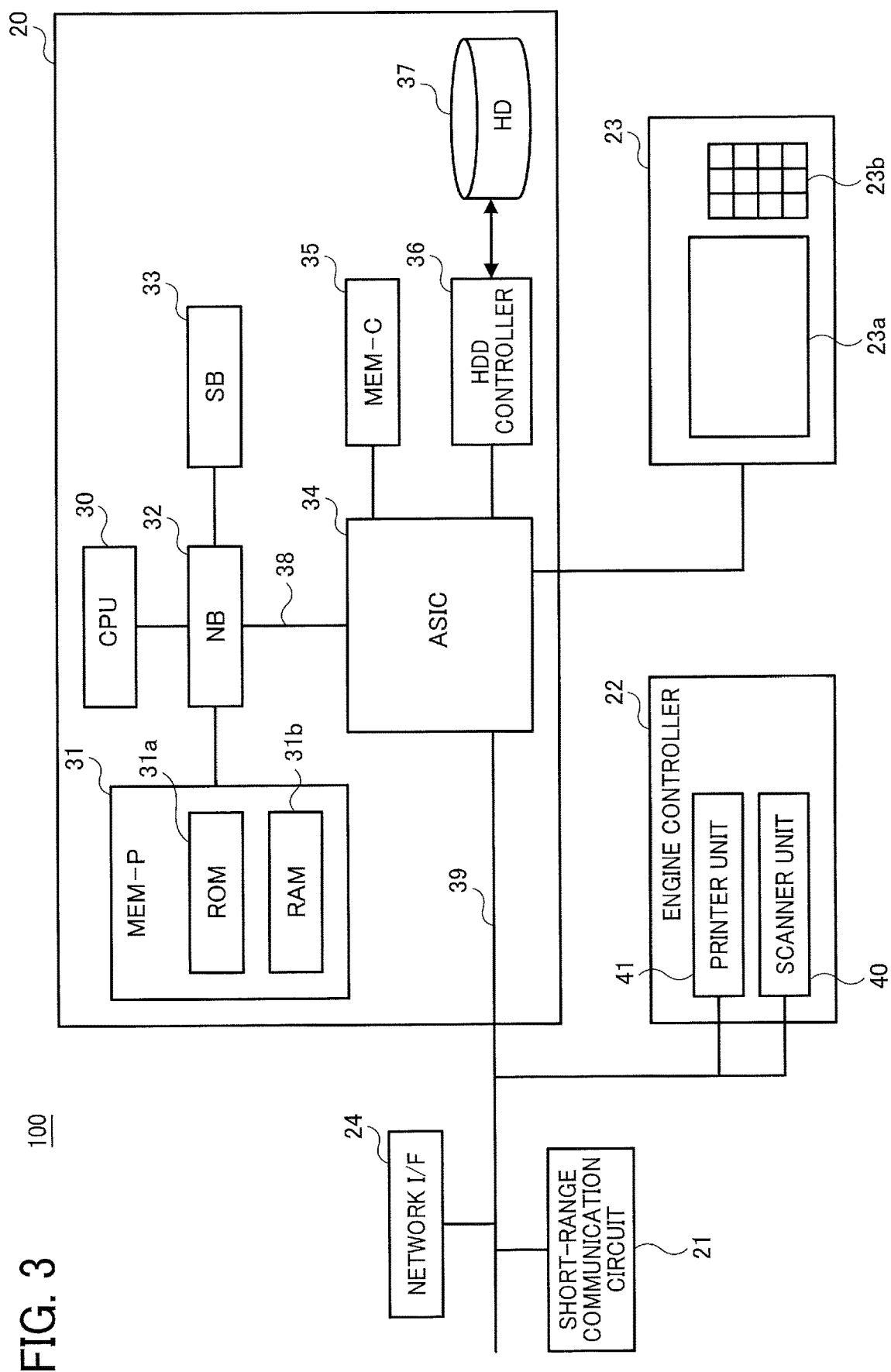
FIG. 3 is a block diagram illustrating an example of a hardware configuration of an image forming apparatus according to one embodiment.

Such a printed matter can be formed by image formation by an image forming apparatus. FIG. 3 is a block diagram illustrating an example of a hardware configuration of an image forming apparatus 100 according to an embodiment of the present disclosure. The image forming apparatus 100 may be a printer having only a printing function, or may be a multifunction peripheral (MFP) having a plurality of functions such as the printing function, a scanner function, a facsimile transmission-reception function, and a copy function. FIG. 3 illustrates a hardware configuration of an MFP as the image forming apparatus 100.

The image forming apparatus 100 includes a controller 20, a short-range communication circuit 21, an engine controller 22, a control panel 23, and a network interface (I/F) 24.

The controller 20 includes a central processing unit (CPU) 30 as a main processor of a computer, a system memory (MEM-P) 31, a northbridge (NB) 32, a southbridge (SB) 33, an application-specific integrated circuit (ASIC) 34, a local memory (MEM-C) 35, a hard disk drive (HDD) controller 36, and a hard disk (HD) 37. The NB 32 and the ASIC 34 are connected by an accelerated graphics port (AGP) bus 38.

The CPU 30 performs overall control of the MFP. The NB 32 is a bridge for connecting the CPU 30, the system memory (MEM-P) 31, the SB 33, and the AGP bus 38, and includes a memory controller for reading from or writing to the memory (MEM-P) 31, a peripheral component interconnect (PCI) master, and an AGP target.

The system memory (MEM-P) 31 includes a read only memory (ROM) 31a as a memory that stores a program or data for implementing various functions of the controller 20. The system memory (MEM-P) 31 further includes a random access memory (RAM) 31b as a memory that deploys the program or data, or as a drawing memory that stores drawing data for printing. The program stored in the RAM 31b may be stored in any computer-readable storage (recording) medium, such as a compact disc-read only memory (CD-ROM), compact disc-recordable (CD-R), or digital versatile disc (DVD), in a file format installable or executable by the computer, for distribution.

The SB 33 connects the NB 32 with a PCI device or a peripheral device. The ASIC 34 is an integrated circuit (IC) including a hardware element, dedicated to an image processing use, and connects the AGP bus 38, a PCI bus 39, the HDD controller 36, and the local memory (MEM-C) 35. The ASIC 34 includes a PCI target, an AGP master, an arbiter (ARB) that is the core of the ASIC 34, a memory controller that controls the local memory (MEM-C) 35, and a plurality of direct memory access controllers (DMACs) that, for example, rotate image data by hardware logic. The ASIC 34 further includes a PCI unit that transfers data between a scanner unit 40 and a printer unit 41 (an image forming device) through the PCI bus 39. In addition, a universal serial bus (USB) interface or an Institute of Electrical and Electronics Engineers 1394 (IEEE 1394) interface may be connected to the ASIC 34.

The local memory (MEM-C) 35 is used as a buffer for image data to be copied or a code buffer. The HD 37 stores various image data, font data for printing, and form data. The HDD controller 36 controls reading or writing data from and to the HD 37 under control of the CPU 30. The AGP bus 38 is a bus interface for a graphics accelerator card, which is proposed to accelerate graphics processing. By directly accessing the system memory (MEM-P) 31 at high-throughput, speed of the graphics accelerator card is improved.

The short-range communication circuit 21 is a communication circuit that perform communication using short-range communication, BLUETOOTH, or the like.

The engine controller 22 includes the scanner unit 40 and the printer unit 41. The control panel 23 includes a panel display 23a such as a touch panel and an operation panel 23b. The panel display 23a displays current settings or a selection screen and receives a user input. The operation panel 23b includes, for example, a numeric keypad to receive settings for various image forming parameters such as an image density parameter, and a start key to receive an instruction to start, e.g., copying.

The controller 20 controls, for example, drawing operation, communication, and inputs from the control panel 23. The scanner unit 40 and the printer unit 41 include an image processor and perform various image processing, such as error diffusion or gamma conversion.

In this MFP, with an application switching key on the control panel 23, an operator can sequentially switch the function among a document server function, a copy function, a print function, and a facsimile function. When each function is selected, the MFP enters a corresponding mode.

The network I/F 24 is an interface that transmits or receives data through a communication network. The short-range communication circuit 21 and the network I/F 24 are electrically connected to the ASIC 34 through the PCI bus 39.

Figure 4:
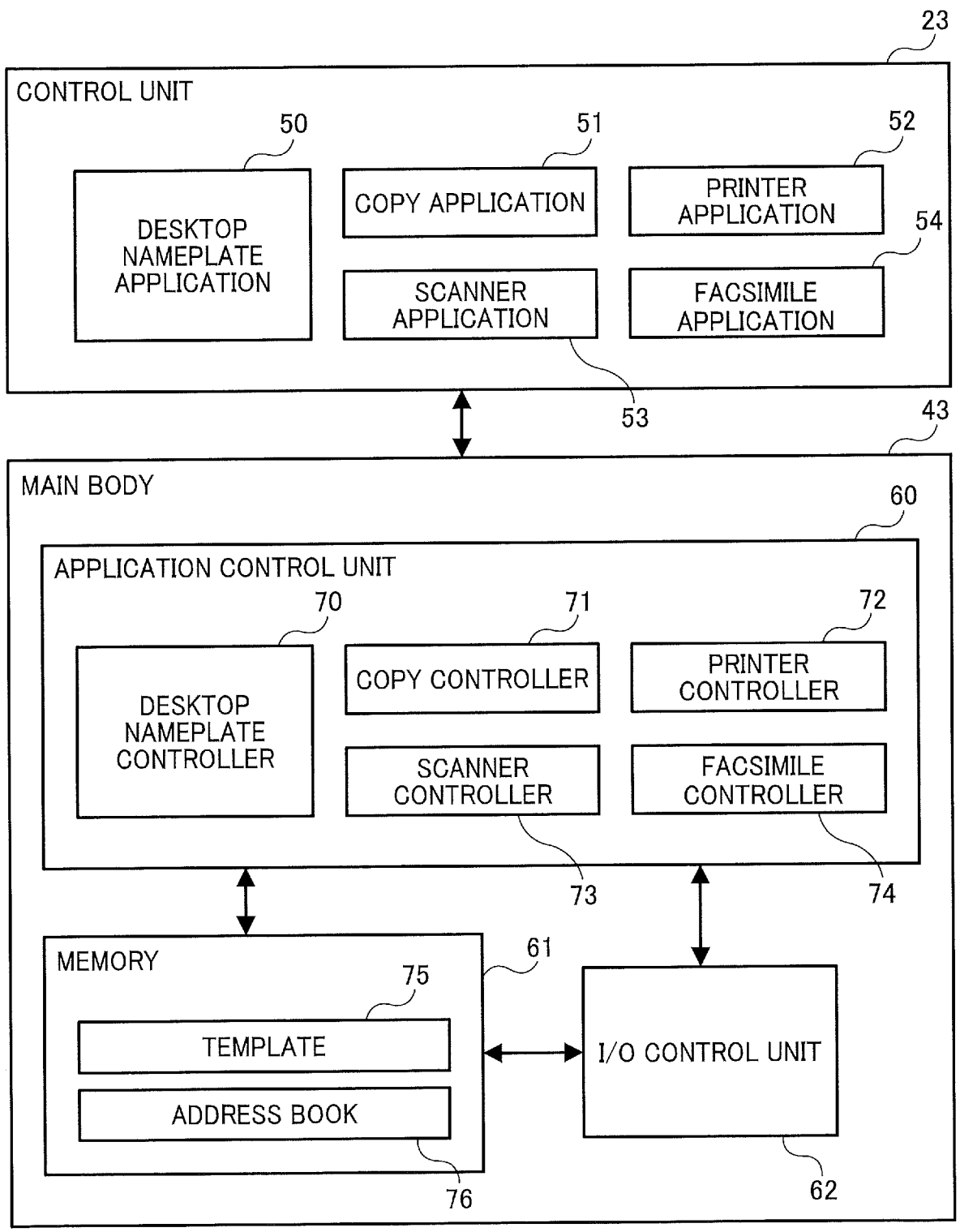
FIG. 4 is a block diagram illustrating an example of a functional configuration of the image forming apparatus according to one embodiment.

FIG. 4 is a block diagram illustrating an example of a functional configuration of the image forming apparatus 100. The image forming apparatus 100 includes the control panel 23 and a main body 43. The control panel 23 implements a plurality of application software (hereinafter referred to as applications). Each application functions as an acquisition unit that acquires information. The control panel 23 implements applications such as a desktop nameplate application 50, a copy application 51, a printer application 52, a scanner application 53, and a facsimile application 54. The main body 43 includes an application controller 60 that includes a desktop nameplate controller 70, a copy controller 71, a printer controller 72, a scanner controller 73, and a facsimile controller 74.

The desktop nameplate application 50 receives an input of a name to be combined with the template, and instructs the desktop nameplate controller 70 to combine the input name with the template. When there are two or more templates, the desktop nameplate application 50 can receive selecting of a template, retrieve the selected template, and instruct the desktop nameplate controller 70 to combine the retrieved template with the name.

The copy application 51 instructs the printer controller 72 to read a document placed on a document table and print the read data on paper or a sheet. The printer application 52 instructs the printer controller 72 to print the designated data on paper or a sheet. The scanner application 53 instructs the scanner controller 73 to read a document placed on the document table and output image data. The facsimile application 54 instructs the facsimile controller 74 to transmit a facsimile to a designated transmission destination and receive a facsimile addressed to the machine to which the facsimile application 54 belongs. The copy application 51, the printer application 52, the scanner application 53, and the facsimile application 54 receive setting information necessary for performing copying, printing, scanning, and facsimile transmission and reception, respectively. The setting information is information indicating, for example, color or monochrome and a sheet size.

The main body 43 includes a memory 61 and an input and output (I/O) control unit 62.

The desktop nameplate controller 70 executes processing of enlarging or reducing the character string (e.g., name) input by the user such that the name fits in the name input areas 14a and 14b of the template, copying the name, rotating the name by 180°, and combining the name with the name input areas 14a and 14b of the template. The positions and height and width sizes of the name input areas 14a and 14b of the template are determined by the size of the paper sheet to be used. Therefore, the desktop nameplate controller 70 enlarges or reduces the character string (e.g., name) to the maximum size that can fit in the name input areas 14a and 14b. When the character string is enlarged or reduced, the desktop nameplate controller 70 enlarges or reduces the height and width of the character string at the same ratio.

To combine the name with the name input areas 14a and 14b of the template, the contour of the line representing the name is cut out and pasted to the name input areas 14a and 14b. A rectangle including a background portion around the name may be cut out and pasted to the name input areas 14a and 14b to be combined.

The copy controller 71, the printer controller 72, the scanner controller 73, and the facsimile controller 74 respectively set the setting information received by the copy application 51, the printer application 52, the scanner application 53, and the facsimile application 54, and perform processing of, for example, enlarging or reducing an image and correcting the image based on the setting information.

The memory 61 stores a template 75 and an address book 76. The template 75 is image data in which a folding method and a name input area are defined. In the address book 76, the name of the user is registered in association with identification information such as a user identifier (ID) identifying the user. The address book 76 may include information such as a mail address, an address, and a telephone number of the user in addition to the name of the user. In another embodiment, the desktop nameplate controller 70 acquires the template 75 from a memory 61 outside the image forming apparatus 100.

The I/O control unit 62 controls input and output of image data by controlling the scanner unit 40 that executes scanning and the printer unit 41 (e.g., a plotter device) that executes printing.

In the description above, each application or functional unit implements the above-described function. More specifically, each function is implemented by the CPU 30 executing a program including the application. Each function may be implemented by, in addition to a programmed processor (e.g., the CPU 30) to execute each function by software, an application-specific integrated circuit (ASIC) or devices such as a digital signal processor (DSP), a field-programmable gate array (FPGA), and a conventional circuit module designed to execute each function.

Figure 5:
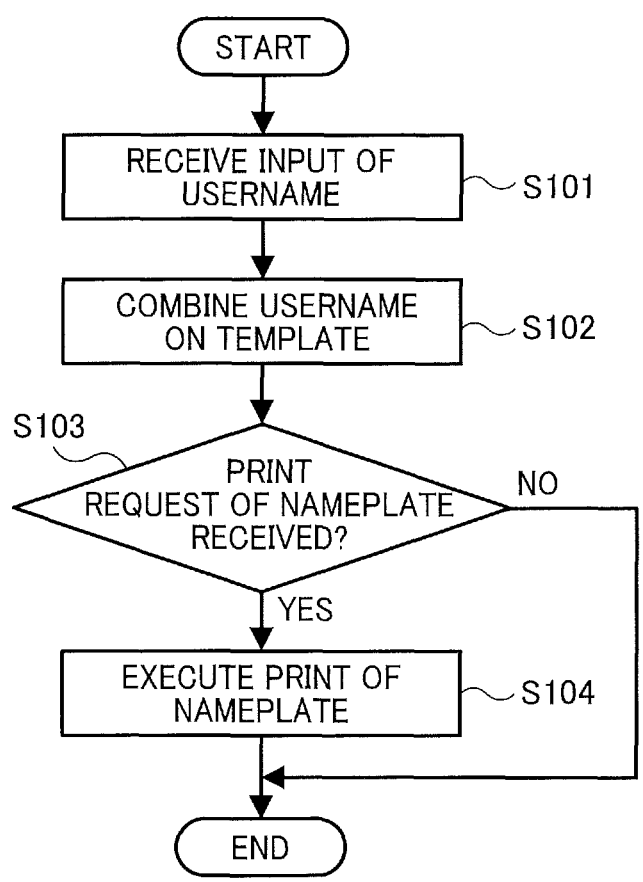
FIG. 5 is a flowchart illustrating a first example of a desktop nameplate print process performed by the image forming apparatus illustrated in FIG. 4.

FIG. 5 is a flowchart illustrating a first example of a desktop nameplate print process performed by the image forming apparatus 100. In response to touching of an icon representing the desktop nameplate application 50 on the control panel 23, the image forming apparatus 100 starts printing the desktop nameplate from step S101. When the desktop nameplate application 50 is activated, the desktop nameplate application 50 displays a screen for inputting a username. In step S101, the desktop nameplate application 50 receives a username manually input by the user using the keyboard displayed on the control panel 23.

In step S102, the desktop nameplate controller 70 reads out the template from the memory 61 and combines the input username with the template (overlays the username thereon). The desktop nameplate application 50 displays the template combined with the username as a preview on the control panel 23.

In step S103, the user views the displayed preview, and presses a print start button (start button) to print the displayed contents. The desktop nameplate controller 70 determines whether or not a print request for the desktop nameplate is received based on whether or not the print start button is pressed. When the print request is received (Yes in S103), in step S104, the I/O control unit 62 controls the plotter device to execute printing of the desktop nameplate. When the printing is completed, the process ends.

On the other hand, when the print request is not received (No in S103), that is, for example, when the print request is not received after an elapse of a certain time, the process ends without printing of the desktop nameplate.

Figure 6:
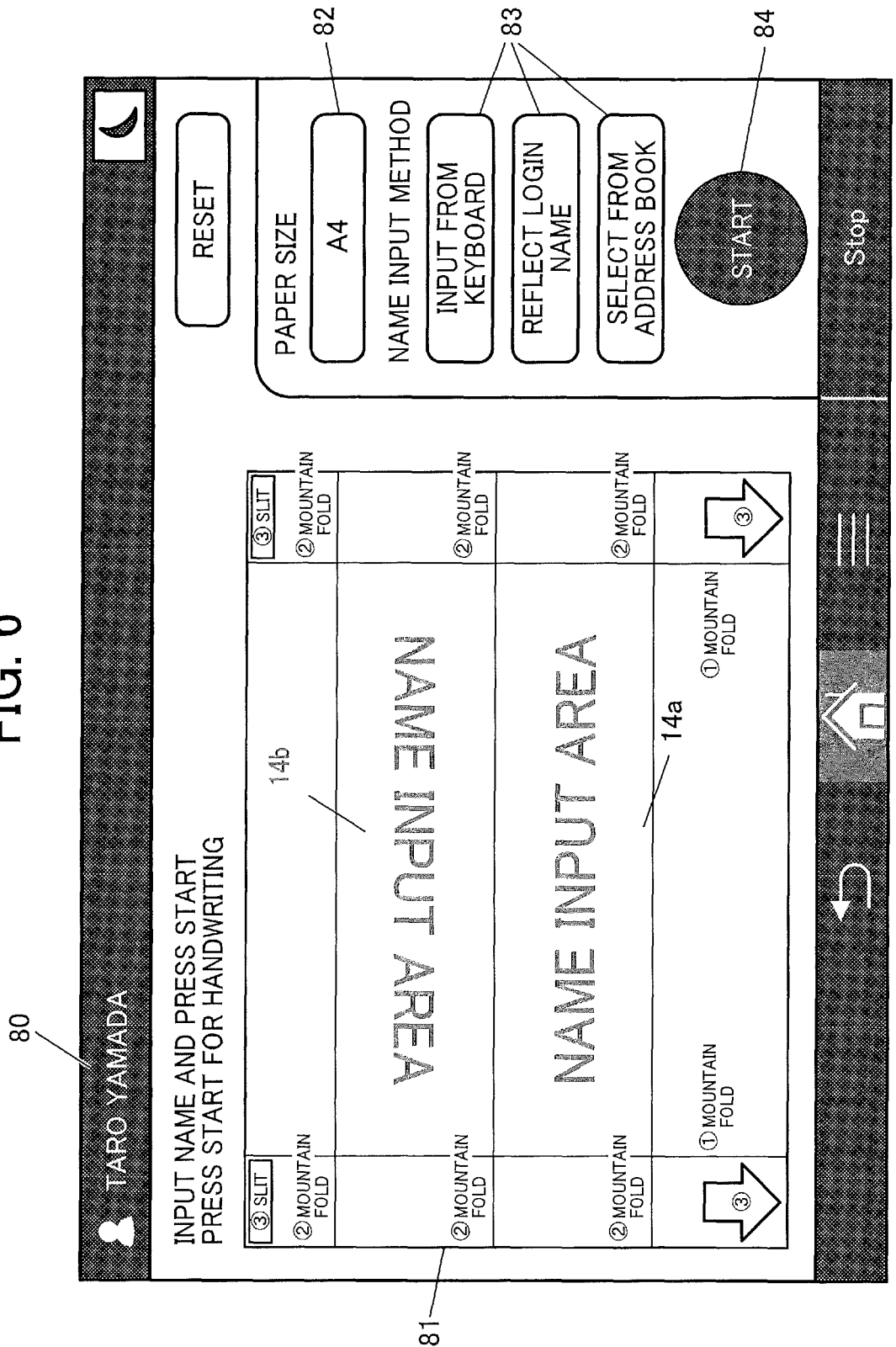
FIG. 6 is a diagram illustrating a first example of a screen displayed on a control panel of the image forming apparatus illustrated in FIG. 4.

FIG. 6 is a diagram illustrating an example of a screen displayed on the control panel 23 when the desktop nameplate application 50 is activated. On the home screen of the control panel 23, icons representing the copy application 51, the printer application 52, the scanner application 53, and the facsimile application 54 are displayed in addition to the icon representing the desktop nameplate application 50. When the icon representing the desktop nameplate application 50 on the home screen is activated by, for example, touching, the screen can be transitioned to a screen illustrated in FIG. 6. When the desktop nameplate application 50 is activated, a login screen may be displayed in order to check whether or not the user is permitted to use the desktop nameplate application 50, and the screen transitions in response to authentication of a user ID and a password input by the user. The screen illustrated in FIG. 6 is a screen after login.

The screen illustrated in FIG. 6 includes a username 80 associated with the user ID input on the login screen, a default template 81, a paper size selection field 82, a name input method selection fields 83, and a print start button 84. The template 81 illustrated in FIG. 6 is a default template corresponding to A4 paper size. In the example illustrated in FIG. 6, the name input method is not selected. The name is not yet put in the name input areas 14a and 14b, and only the template 81 is displayed.

Figure 7:
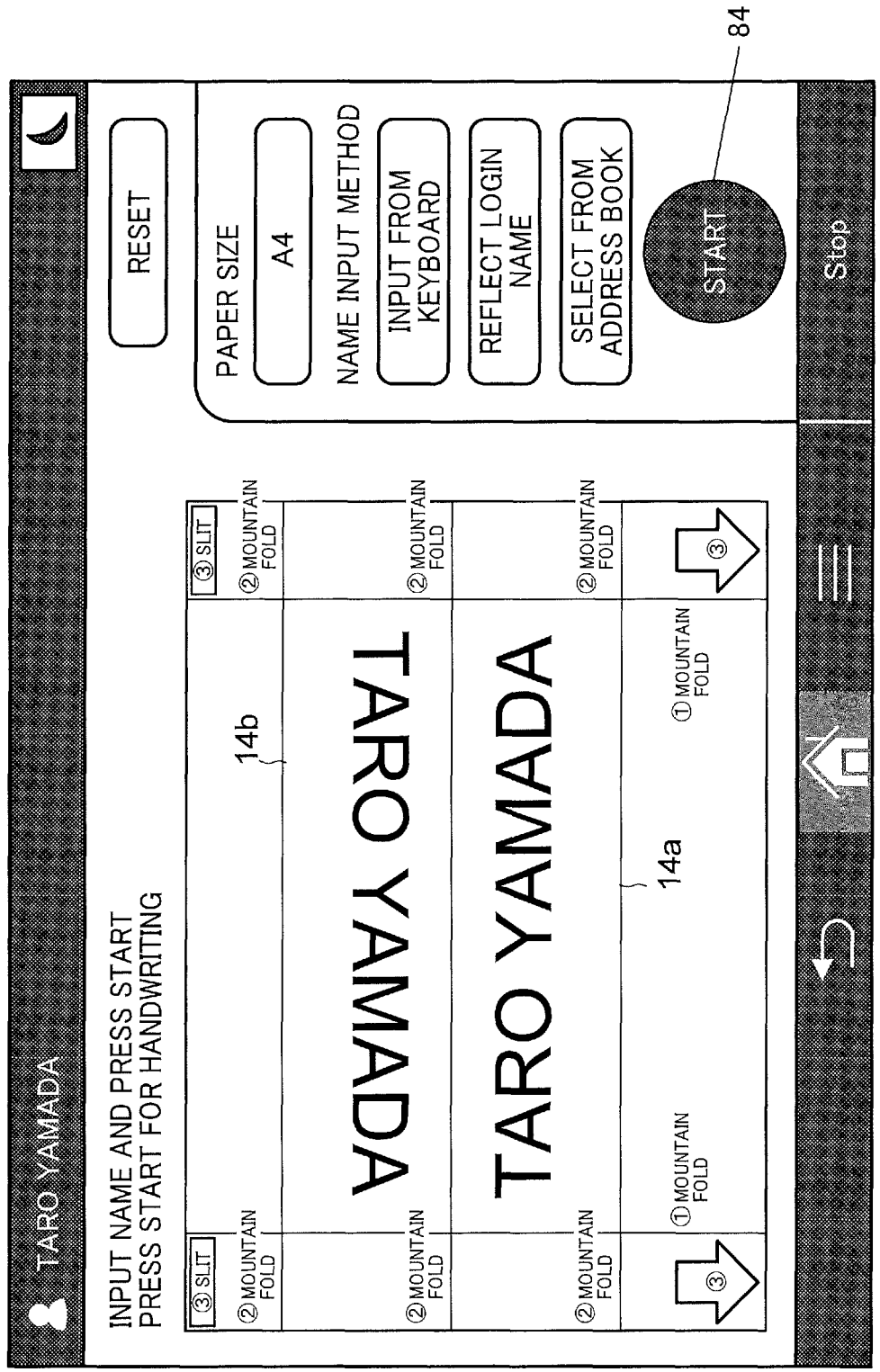
FIG. 7 is a diagram illustrating a second example of the screen displayed on the control panel of the image forming apparatus illustrated in FIG. 4.

FIG. 7 is a diagram illustrating an example of a screen after the name input method is selected and the name is input on the screen illustrated in FIG. 6. When "input from keyboard" is selected as the name input method, a keyboard is displayed on the control panel 23, and the user can input a name using the keyboard. When "reflect login name" is selected, the username displayed at the upper left of the screen is input as the name. When "select from address book" is selected, an address book is displayed, and a username can be selected from the address book.

When the name is input, the text data is enlarged or reduced so as to fit in the name input areas 14a and 14b, and the enlarged or reduced text data is copied and rotated by 180°. Then, the text data is pasted to each of the name input areas 14a and 14b, and the text data and the template are combined together. In the example illustrated in FIG. 7, the template combined with the text data is previewed. The user can print the same image as the preview display by checking the preview display and pressing the print start button 84.

FIG. 8 is a diagram illustrating an example of template data (management information) stored in the memory 61. The data is stored in a table format and includes preference setting (i.e., preference information), paper size, image path, name input area start position, name input area size, and desktop nameplate template images. The preference setting is for setting whether to display that template upon activation of the desktop nameplate application, that is, for setting the template of a certain sheet size to be preferentially displayed as default. "On" is assigned to the template used as default.

The paper size is represented by, for example, A4 or B5, which is a standard size. In this example, only two sizes are presented, but the number of sizes is not limited to two, and may be one or three or more.

Figure 9:
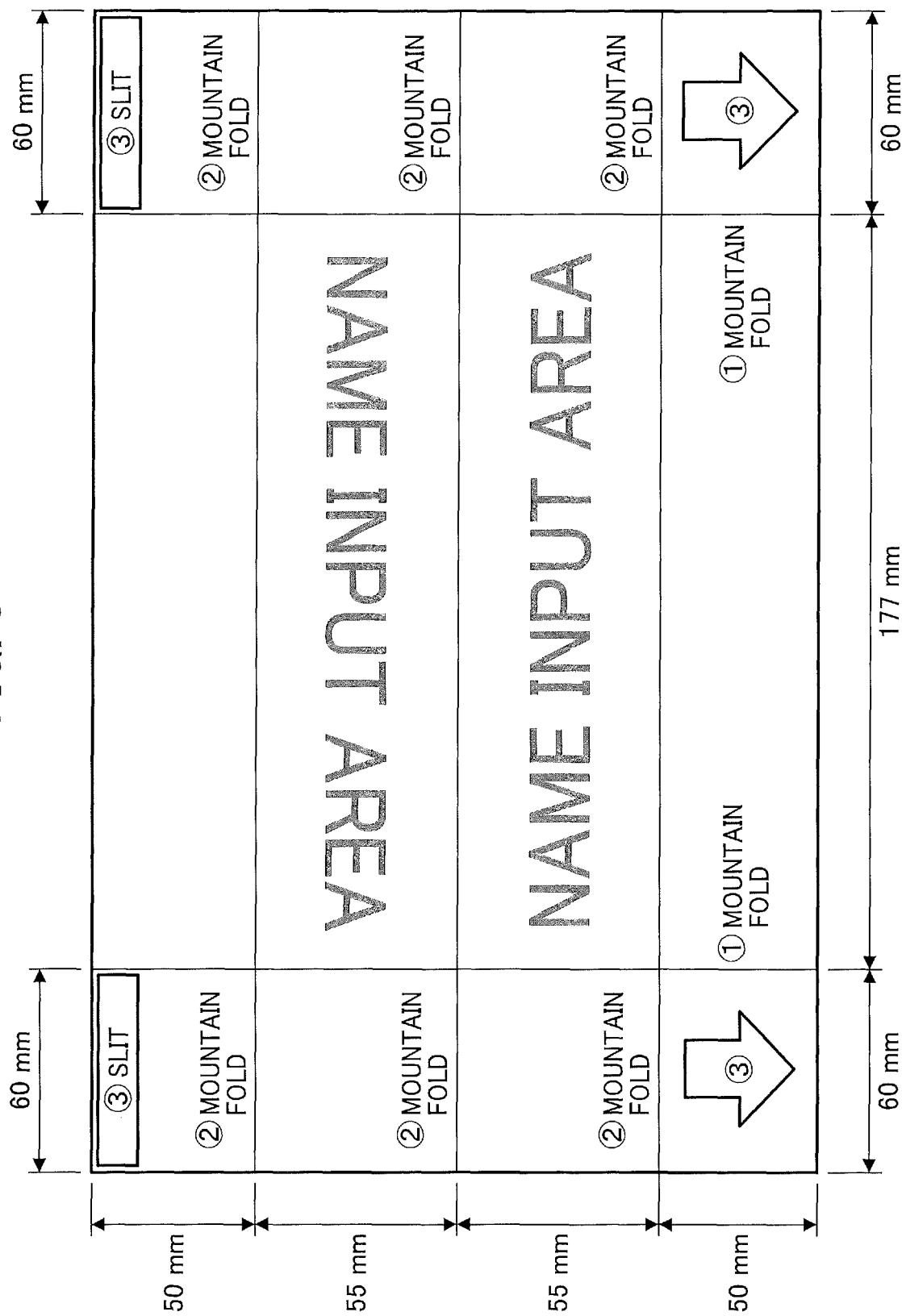
FIG. 9 is a diagram illustrating an example of a template image in which a folding method according to a paper size is indicated.

The image path is path information (character string) indicating the location of the data of the desktop nameplate template image. The name input area start position and the name input area size will be described with reference to FIG. 9. FIG. 9 is a diagram illustrating an example of a template image in which a folding method corresponding to a paper size is indicated. FIG. 9 illustrates a template image for the paper size "A4."

In the name input area start position, for example, the vertex at the lower left corner in FIG. 9 is set as a reference (height 0 mm and width 0 mm). The positions in the vertical direction and the lateral direction from the reference are represented by coordinates, and 50 mm in the vertical direction and 60 mm in the lateral direction are set. There are two name input areas. When the start position of one of the two name input areas closer to the reference is defined, the position of the other is shifted by 55 mm only in the vertical direction and can be determined as height 105 mm (50 mm plus 55 mm) and width 60 mm. In this example, the vertex at the lower left corner is used as the reference, but the reference is not limited thereto. Any one of other three corner portions may be used as the reference, or another point may be used as the reference.

The name input area size is the size of an area with which an input name is to be combined, and is 55 mm in height and 177 mm in width. Although there are two name input areas, both areas have the same size, and only the size of one area is illustrated.

These numerical values such as the height 50 mm and the width 60 mm can be freely determined, and in the case of the "A4" size, other numerical values such as the height 55 mm and the width 65 mm may be set.

Figure 10:
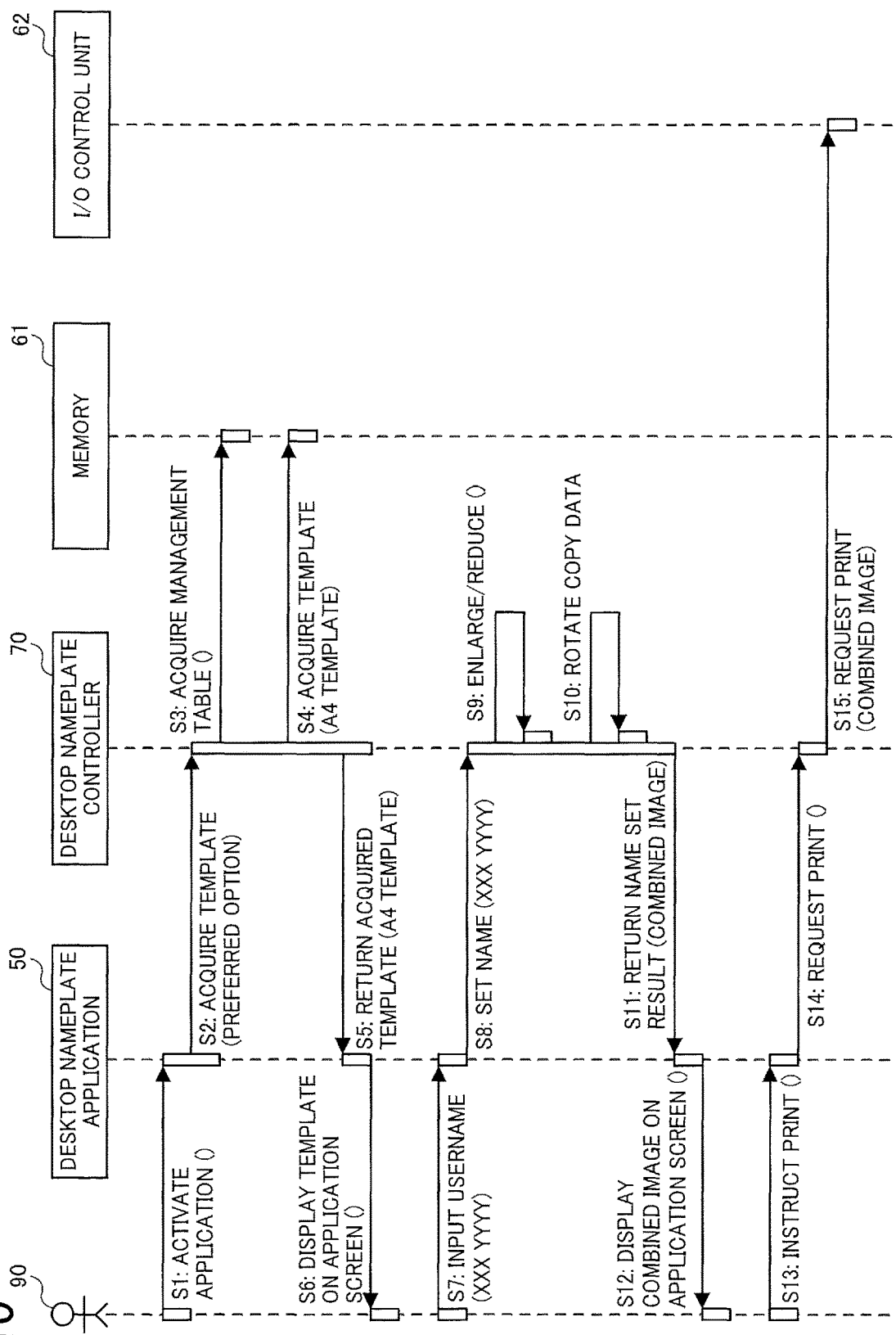
FIG. 10 is a sequence diagram illustrating a process of printing of a desktop nameplate using a desktop nameplate application illustrated in FIG. 4.

FIG. 10 is a sequence diagram illustrating a process of printing a desktop nameplate executed by the image forming apparatus 100. For printing the desktop nameplate, a user 90 moves to the image forming apparatus 100, taps the icon representing the desktop nameplate application 50 on the home screen of the control panel 23 of the image forming apparatus 100, and activates the desktop nameplate application 50 (S1).

The desktop nameplate application 50 requests the desktop nameplate controller 70 to acquire a default template, that is, a template set as a preferred option (S2). In response to the request from the desktop nameplate application 50, the desktop nameplate controller 70 acquires the management table storing the desktop nameplate template from the memory 61 (S3). The desktop nameplate controller 70 refers to the management table and acquires the desktop nameplate template image, using the image path of the paper size set as the preferred option (S4).

The desktop nameplate controller 70 returns the acquired desktop nameplate template image to the desktop nameplate application 50 as an acquisition result (S5). The desktop nameplate application 50 displays the desktop nameplate template image acquired from the desktop nameplate controller 70 on the control panel 23 (S6).

When the user 90 selects the default paper size and "input from keyboard" as the name input method, the keyboard appears on the control panel 23. The user 90 inputs his or her name using the keyboard (S7).

When the user wants to change the paper size from the default paper size, the user 90 can select another paper size. When the paper size is changed, the process returns to S2. The desktop nameplate application 50 requests the desktop nameplate controller 70 to acquire a template of the selected paper size instead of the preferred option. Since the process after the S3 is the same as that described above, redundant descriptions are omitted here.

When the user 90 inputs a name in S7, the desktop nameplate application 50 sends the text data of the input name and requests the desktop nameplate controller 70 to set the name (S8). The desktop nameplate controller 70 enlarges or reduces the character size of the text data so as to fit in the name input areas 14*a* and 14*b* of the desktop nameplate image (S9). The character size is, for example, the maximum size that can fit in the name input areas 14*a* and 14*b*. The text data is arranged at the center of each of the name input areas 14*a* and 14*b*.

The desktop nameplate controller 70 copies the text data whose character size has been enlarged or reduced in S9 so as to paste the text data in the two name input areas 14*a* and 14*b* and combine the text data with the template. The desktop nameplate controller 70 uses the copied text data to generate text data that is rotated by 180° as a whole (S10). The desktop nameplate controller 70 pastes the text data whose character size is enlarged or reduced to one of the two name input areas 14*a* and 14*b*, pastes the copied text data rotated by 180° to the other of the two name input areas 14*a* and 14*b*, and combines the name with the desktop nameplate template image.

The desktop nameplate controller 70 returns the combined image as a name set result to the desktop nameplate application 50 (S11). The desktop nameplate application 50 displays the combined image in which the desktop nameplate template image includes the name of the user 90 on the control panel 23 (S12).

The user 90 views the combined image displayed on the control panel 23. When the combined image is acceptable, the user 90 presses the print start button to instruct the print start of the combined image (S13). The desktop nameplate application 50 receives a print instruction from the user 90 and requests the desktop nameplate controller 70 to print the combined image (S14). In response to the print request from the desktop nameplate application 50, the desktop nameplate controller 70 requests the I/O control unit 62 to print the combined image (S15).

The I/O control unit 62 controls the plotter device based on the print data of the combined image to print the combined image on paper.

In a conventional image forming apparatus in which the desktop nameplate application 50 is not installed, for example the user has to follow the procedure below to print a desktop nameplate, which is burdensome.

1: Create a desktop nameplate template defining a folding method and a name input area in advance on a PC.
2: Open the desktop nameplate template on the PC.
3: Enter a name in a name input area of the template.
4: Enlarge or reduce the input name to fit the name in the name input area by himself/herself.
5: Activate a printer driver to print the desktop nameplate.

By contrast, according to the present embodiment, the user can print a desktop nameplate in the following procedure.

1: Activate the desktop nameplate application 50.
2: Input a name from the keyboard.
3: Press the print start button to print the desktop nameplate.

This method can reduce the work to be performed by the user and obviate the necessity for the user to process (e.g., enlarge or reduce) the text by himself/herself. Therefore, this method can shorten the work time and simplify the work of the user.

The image forming apparatus 100 can perform user authentication when the user uses the function thereof. The user authentication is performed by comparing the authentication information input by the user with the registered authentication information. The authentication information includes, for example, a user ID, a password, and biometric information. The user ID and the password may be input by the user. Alternatively, the user ID and the password may be recorded on an integrated circuit (IC) card, a smartphone, a radio frequency identification (RFID) tag, or the like incorporating an IC chip so as to be read in a contactless manner when the user brings the IC card, the smartphone, the RFID tag, or the like close to an IC reader (a reading device). Examples of biometric information used for biometric authentication include a fingerprint, an iris, a vein, a voiceprint, a face shape, and handwriting.

The authentication information is registered in association with the name of the user. When a user registered in the image forming apparatus 100 performs user authentication, the image forming apparatus 100 can acquire the username from the input authentication information. Thus, manual input using the keyboard can be omitted. Since the input of the username is unnecessary, this method can further reduce the work performed by the user.

Figure 11:
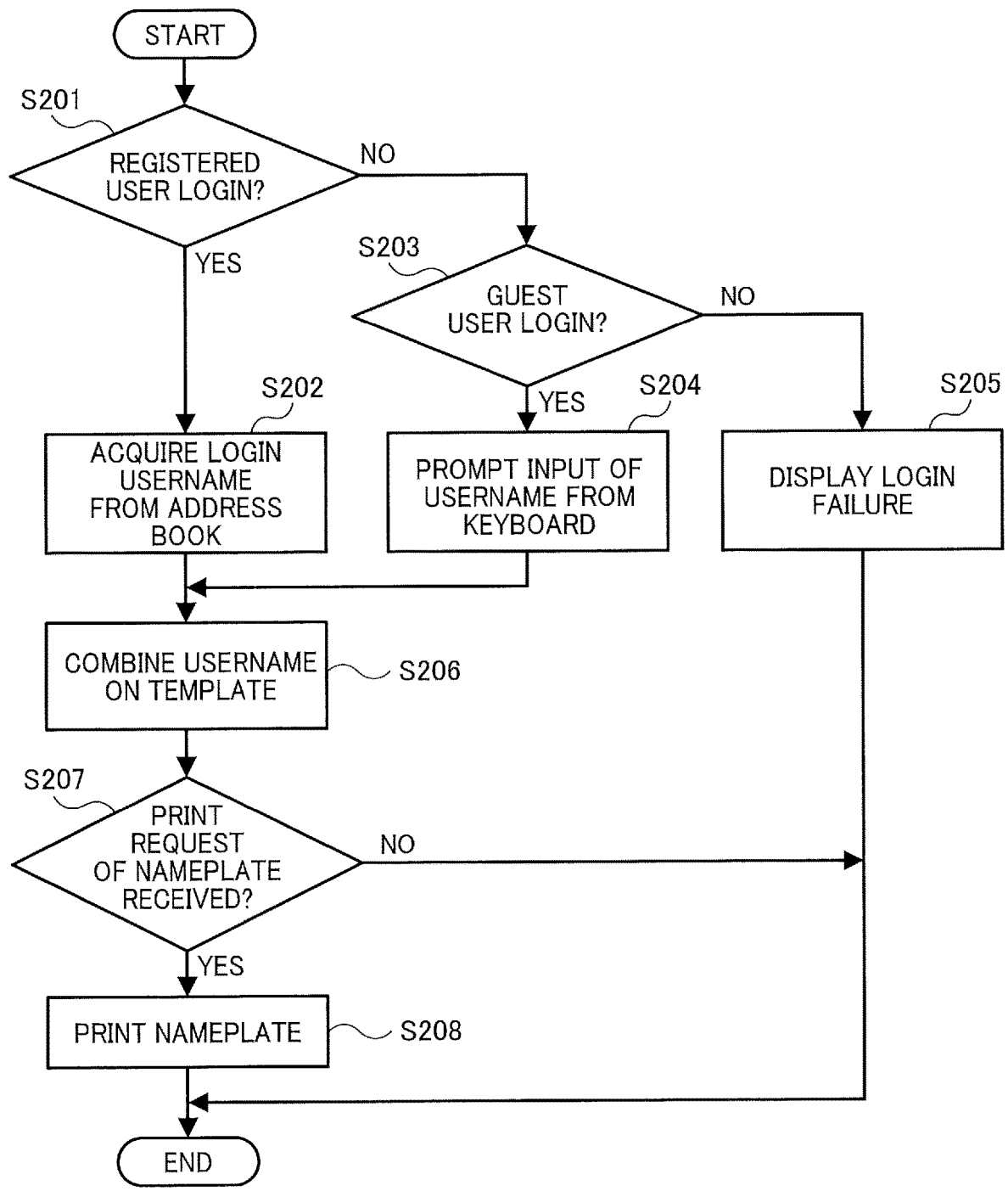
FIG. 11 is a flowchart illustrating a second example of the desktop nameplate print process, in which user information upon login is used, performed by the image forming apparatus illustrated in FIG. 4.

FIG. 11 is a flowchart illustrating a second example of the desktop nameplate print process performed by the image forming apparatus 100. Printing of the desktop nameplate is started when the user activates the desktop nameplate application 50 by touching or the like on the control panel 23 of the image forming apparatus 100. When the desktop nameplate application 50 is activated, in step S201, the desktop nameplate application 50 determines whether the registered user has logged in. When activated, the desktop nameplate application 50 displays a login screen and prompts the user to input authentication information.

In response to a determination that the registered user has logged in (Yes in S201), the image forming apparatus 100 proceeds to step S202 to acquire the login username from the address book. When the image forming apparatus 100 determines that the logged-in user is not registered (No in S201), the user is a guest user or a user who is not permitted to use the desktop nameplate application 50. The guest user is, for example, a participant from another company or another department who participates in the meeting.

In step S203, the image forming apparatus 100 determines whether the guest user has logged in. A guest user may be given a guest user ID and password. The guest user authenticated as a user of the image forming apparatus 100 can use a function of the image forming apparatus 100, for example, printing of a desktop nameplate.

In response to a determination that the guest user has logged in (Yes in S203), the process proceeds to step S204. The desktop nameplate application 50 prompts the user to input the username manually using the keyboard. This is because the guest user is not registered in the address book. On the other hand, in response to a determination that the logged-in user is not a guest user (NO in S203), the process proceeds to step S205. The desktop nameplate application 50 displays a login failure since the user is not given a guest user ID and a password for the guest and thus is not permitted to use a function of the image forming apparatus 100. Then, the desktop nameplate application 50 ends the printing process.

After acquiring the username in step S202 or receiving the username input in step S204, in step S206, the desktop nameplate controller 70 combines the desktop nameplate template with the username and previews the combined image. The user checks the displayed combined image and determines whether to print the combined image. For printing, the user presses the print start button.

In step S207, the desktop nameplate application 50 determines whether or not a print request for the desktop nameplate has been received based on whether or not the print start button has been pressed. In response to a determination that the print request has been received (Yes in S207), in step S208, the desktop nameplate application 50 requests printing of the desktop nameplate. Upon completion of printing, the process ends. In response to a determination that the print request has not been received (No in S207), the process ends.

In step S202, the username associated with the user ID can be automatically acquired, but the login name may be acquired in response to the user's pressing "reflect login name" on the screen illustrated in FIG. 6. The login name is the same as the username, and is stored in association with the user ID.

In step S202, the username may be acquired in response to the user's pressing "select from address book" on the screen illustrated in FIG. 6 and selecting of a username from the displayed address book.

Figure 12:
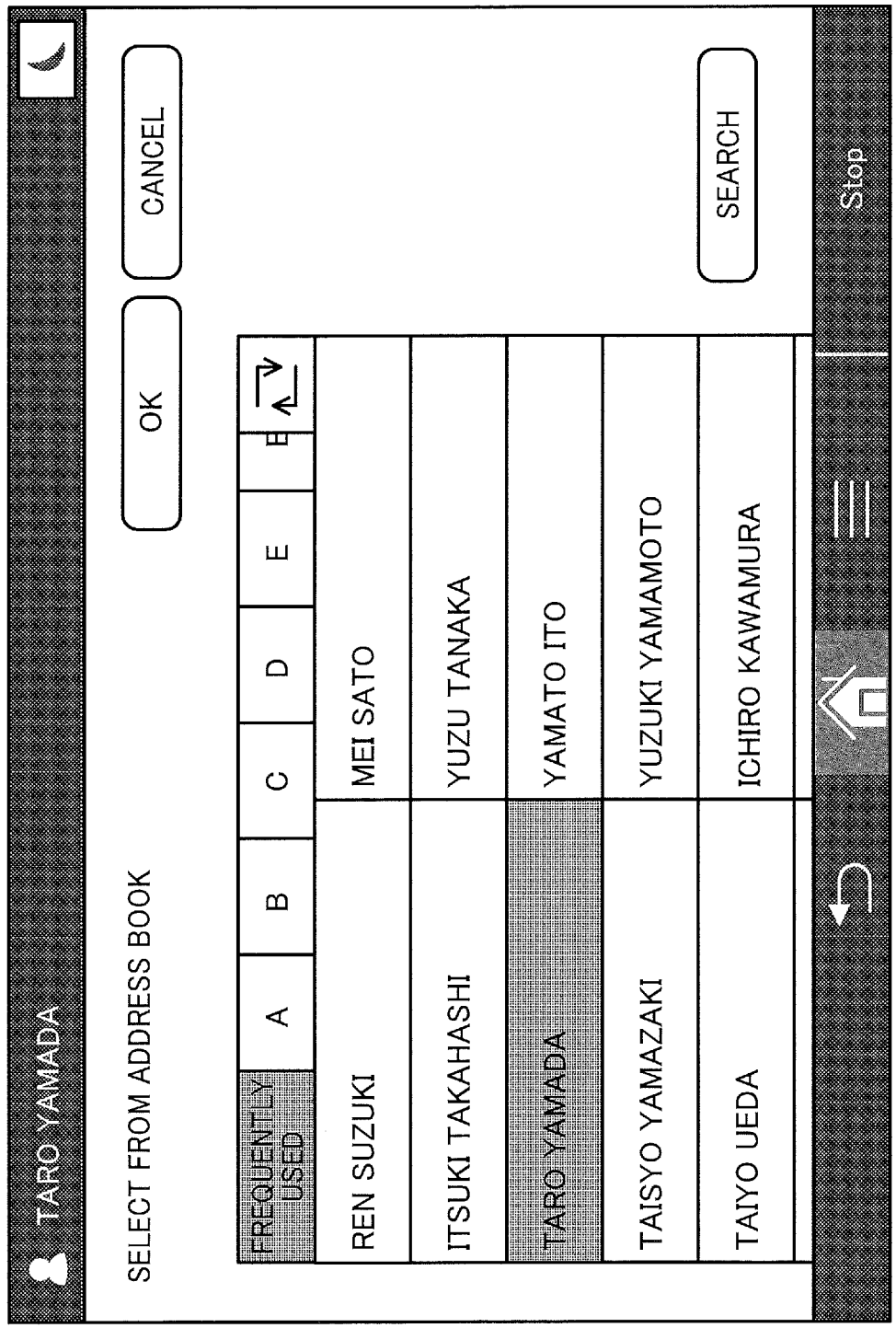
FIG. 12 is a diagram illustrating a third example of the screen displayed on the control panel of the image forming apparatus illustrated in FIG. 4.

FIG. 12 is a diagram illustrating an example of an address book selection screen. In the address book, names of registered users are arranged in order. The user can search for his/her name, select a name, and press an OK button to reflect the name in the name input areas of the template. In the address book, the hidden portion can be displayed (scrolled) in response to moving up, down, left, and right a finger in contact with the screen of the control panel 23. The method of scrolling the screen is not limited thereto. For example, the screen may be scrolled in response to moving a scroll bar.

Figure 13:
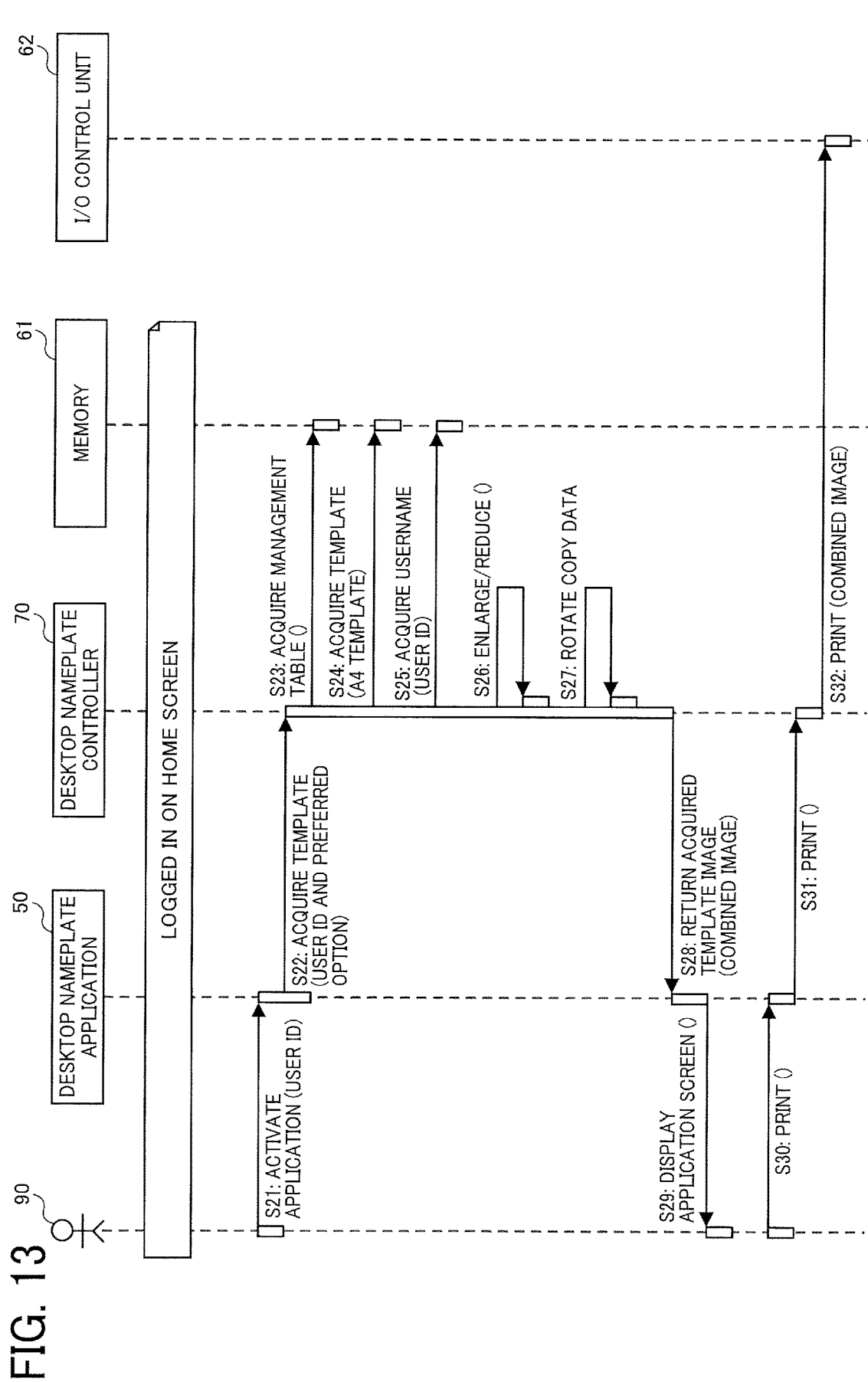
FIG. 13 is a sequence diagram illustrating a printing process using user information upon login, which includes the process illustrated in FIG. 11.

FIG. 13 is a sequence diagram illustrating a printing process using the user information acquired at the time of login. A detailed description is given of the printing process of the desktop nameplate, which is briefly described with reference to FIG. 11. On the home screen on the control panel 23, for example, when an icon or the like representing the desktop nameplate application 50 is pressed and activated, a screen for requesting input of a user ID and a password is displayed. In this example, the screen for requesting input of a user ID or the like is displayed in response to pressing of the icon representing the desktop nameplate application 50, but the present disclosure is not limited thereto. When the user inputs the user ID and the password and the user authentication is successful, the user is permitted to use the printing function of the desktop nameplate.

The user 90 presses the icon of the desktop nameplate application 50 displayed on the home screen to activate the desktop nameplate application 50 (S21). The desktop nameplate application 50 requests the desktop nameplate controller 70 to acquire the default template (S22), in order to display the default template on the screen. The desktop nameplate application 50 notifies the desktop nameplate controller 70 of the user ID of the logged-in user 90 and requests the desktop nameplate controller 70 to acquire a template set as a preferred option.

The desktop nameplate controller 70 acquires the management table from the memory 61 (S23). The management table includes preference setting information and image path information. The desktop nameplate controller 70 refers to the management table and acquires the image path associated with the paper size for which the preference setting is on. The desktop nameplate controller 70 uses the acquired image path to acquire the template stored in the storage location indicated by the image path (S24).

The desktop nameplate controller 70 searches the address book based on the user ID acquired from the desktop nameplate application 50, and acquires the username as text data (S25). The desktop nameplate controller 70 enlarges or reduces the character string of the acquired text data to a maximum size that can fit in the name input area size defined by the paper size for which the preference setting is on in the management table (S26). The text data is enlarged or reduced such that the height and the width of the entire character string is changed with equal magnifications.

The desktop nameplate controller 70 copies the enlarged or reduced text data (first text data) and rotates the entire character string of the copied text data by 180°, to generate second text data (S27). The desktop nameplate controller 70 pastes the character string of the first text data and the character string of the second text data in the two name input areas 14a and 14b (see FIGS. 5 and 6) in the template, so as to combine the template and the username.

The desktop nameplate controller 70 returns an image of the combined desktop nameplate template to the desktop nameplate application 50 as an acquisition result (S28). The desktop nameplate application 50 displays the combined image acquired from the desktop nameplate controller 70 on the control panel 23 (S29).

The user 90 checks the combined image displayed on the control panel 23. When the user 90 accepts the default paper size and the username is correct, the user 90 presses the print start button to instruct the desktop nameplate application 50 to execute printing (S30). When the user wants to change the paper size from the default paper size, the user can select another paper size. When the paper size is changed, the process returns to S22. The desktop nameplate application 50 requests the desktop nameplate controller 70 to acquire a template of the selected paper size instead of the preferred option. Since the process after the S23 is the same as that described above, redundant descriptions are omitted here.

In response to the print instruction from the user 90, the desktop nameplate application 50 requests the desktop nameplate controller 70 to print the combined image displayed on the control panel 23 (S31). The desktop nameplate controller 70 stores image data of the combined image. In response to a print request from the desktop nameplate application 50, the desktop nameplate controller 70 transmits the image date to the I/O control unit 62 and requests the I/O control unit 62 to perform printing according to the image date (S32).

The I/O control unit 62 controls the plotter device based on the received image data and causes the plotter device to execute printing. The plotter device prints the combined image on paper under the control of the I/O control unit 62.

In this way, as the image forming apparatus 100 automatically acquires the username from the address book using the user ID at the time of login as a key, the number of operations performed by the user is reduced, and the work of the user can be further reduced. As the number of operations performed by the user is reduced, the time from the activation of the desktop nameplate application 50 to the completion of printing is shortened.

The desktop nameplate may indicate not only a name but also other information such as a department name, a company name, and a job title. The department name, the company name, the job title, and the like may be indicated in the same character size as that of the name or in a character size smaller than that. The desktop nameplate controller 70 can enlarge or reduce the entire nameplate contents including the name and other information (e.g., the department name, the company name, and the job title) to fit in the name input areas 14a and 14b. Other information (e.g., the department name, the company name, and the job title) may be arranged in the same line as the name. Alternatively, other information may be arranged in a different line from the name so that the nameplate contents are arranged in two lines.

The above-described embodiment is illustrative and does not limit the present invention. The above-described embodiment may be modified within a range conceivable by those skilled in the art. The modification includes addition of another element and change or deletion of one of the above-described elements. Such modifications are within the scope of the present disclosure as long as the actions and effects of the present disclosure are provided.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An image forming apparatus comprising:
an image forming device configured to perform image formation, and
circuitry configured to:
    acquire, from a memory, a template image defining a user information area in which user information is input;
    acquire the user information based on a user input operation;
    process the user information in accordance with a position and a size of the user information area;
    generate a combined image in which the user information is combined with the template image acquired from the memory; and
    instruct the image forming device to form the combined image on a sheet;
    wherein the template image includes an image of a desktop nameplate defining a folding line and two user information areas including the user information area, the two user information areas in each of which a character string of a username as the user information is input, and
    wherein the circuitry enlarges or reduces each character of the character string in accordance with positions and sizes of the two user information areas.

2. The image forming apparatus according to claim 1, wherein the circuitry copies the enlarged or reduced character string of the username and rotates the copied character string.

3. The image forming apparatus according to claim 1, wherein the circuitry receives input of the user information from a user.

4. The image forming apparatus according to claim 1, wherein the memory stores authentication information for authenticating a user and the user information in association with each other, and wherein the circuitry acquires the user information from the memory based on the authentication information received from the user.

5. The image forming apparatus according to claim 1, wherein the memory stores:
    a plurality of template images each of which defines the user information area corresponding to a sheet size; and
    management information that associates each of the plurality of template images with preference information, the preference information indicating whether to preferentially select path information indicating a storage location of corresponding one of the plurality of template images,
wherein the circuitry acquires one of the plurality of template images using the path information based on the preference information.

6. A method for forming an image including user information, the method comprising:
    acquiring, from a memory, a template image defining a user information area in which the user information is input;
    acquiring the user information based on a user input operation;
    processing the user information in accordance with a position and a size of the user information area;
    generating a combined image in which the user information is combined with the template image; and
    forming the combined image on a sheet;
    wherein the template image includes an image of a desktop nameplate defining a folding line and two user information areas including the user information area, the two user information areas in each of which a character string of a username as the user information is input, and
    wherein the method further comprises enlarging or reducing each character of the character string in accordance with positions and sizes of the two user information areas.

7. An image forming apparatus comprising:
an image forming device configured to perform image formation; and
circuitry configured to:
    acquire, from a memory, a template image defining a user information area in which user information is input;
    acquire the user information based on a user input operation;
    process the user information in accordance with a position and a size of the user information area;
    generate a combined image in which the user information is combined with the template image acquired from the memory; and
instruct the image forming device to form the combined image on a sheet;
    wherein the memory stores:
        a plurality of template images each of which defines the user information area corresponding to a sheet size; and
        management information that associates each of the plurality of template images with preference information, the preference information indicating whether to preferentially select path information indicating a storage location of corresponding one of the plurality of template images, wherein the circuitry acquires one of the plurality of template images using the path information based on the preference information.

\* \* \* \* \*